(No Model.)

J. DOUGHERTY.
Process of Attaching Glass Knobs to Spindles.

No. 231,903. Patented Sept. 7, 1880.

Witnesses
S. N. Piper
M. W. Lunt

Inventor.
John Dougherty,
by attorney
R. H. Eddy

UNITED STATES PATENT OFFICE.

JOHN DOUGHERTY, OF SOMERVILLE, MASSACHUSETTS.

PROCESS OF ATTACHING GLASS KNOBS TO SPINDLES.

SPECIFICATION forming part of Letters Patent No. 231,903, dated September 7, 1880.

Application filed March 8, 1880. (No model.)

*To all whom it may concern:*

Be it known that I, JOHN DOUGHERTY, of Somerville, in the county of Middlesex and State of Massachusetts, have invented a new and useful Improvement in the Art or Process of Making Glass-Headed Door-Knobs; and I do hereby declare the same to be described in the following specification, reference being had to the accompanying drawings, illustrative of a knob made by means of my said invention.

Figure 1:
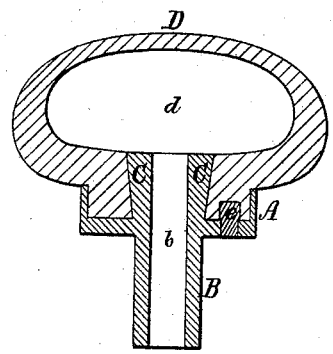
Figure 2:
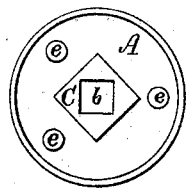

In such drawings, Figure 1 is a transverse section of the knob. Fig. 2 is a top view of the glass-head metallic-shank-receiving cap, to be hereinafter described.

My said invention or improvement consists in the mode, substantially as hereinafter described, of forming the glass head with a silvering-chamber and connecting such head to the shank having a passage leading through it and a cap provided with a tapering projection, the said mode or process consisting in inserting into the cap, so as to fill it and encompass the projection and extend across it, a mass of molten glass sufficient in quantity, and blowing air into it (the said mass of glass) through the said passage, so as to expand the mass and make therein the silvering-chamber.

In the knob so made no cement is used to fix into its metallic cap the shank of the glass head, such cap being provided with a tapering tenon or projection arranged in the cap and extended therefrom into the shank of the head, which, by filling the cap and embracing the tenon or projection, serves, on the glass becoming solid, to connect the head and the cap firmly together.

In order to relieve the tapering projection from strain and prevent the glass surrounding it from being broken on an attempt to turn the knob when fixed to a spindle or shank, the cap may be provided with one or more other or auxiliary projections, to extend from it into the shank of the glass head. Furthermore, to admit of the knob-head being chambered or blown hollow for the purpose of being subsequently silvered within it, I make the tapering projection and the spindle-receiving shank extending from the cap tubular, or with a continuous bore or passage leading axially through them, and preparatory to blowing the head with the chamber in it I attach to the spindle-shank a blowing-tube. This having been done, I insert within and fill the cap with molten glass, and have projecting from such cap a sufficient quantity of such glass to compose the knob-head, and I blow into it, through the spindle-shank and the tubular tapering extension, air, so as to form the knob-head hollow, or with a chamber within it, the said knob-head being also to be molded or shaped externally to the proper form.

In the drawings, A denotes the socketed cap; B, the spindle-receiving shank extending from said cap. C is the tapering projection arranged centrally within the cap and in continuation of the shank B, and, with said shank, is provided with a bore or passage, $b$, which answers two purposes—viz., to receive the knob-spindle and to convey air from the blowing-tube into the mass of molten glass to compose the knob-head D, such knob-head, as shown in the drawings, being blown hollow, or with a silvering-chamber, $d$, arranged within it. On the inner surface of the said chamber being covered with a film of silver deposited upon it from a solution of nitrate of silver by means or a process well known and in common use for such purposes, the larger end of the extension C will be hidden from view through the knob-head.

In the drawings, $e$ are the auxiliary projections or studs extending from the cap into the shank of the glass head, the material of which, on being run or inserted in the cap, will encompass or extend about each of the said auxiliary projections, so as to enable it to aid in relieving the tapering projection and the glass in contact therewith from strain when the knob-head may be in the act of being revolved in order to turn the knob-spindle.

It will be evident that a drawer-knob may be made in manner as above described, in which case the shank B may be provided with a screw for fixing it in a drawer or other article to which it may be applied.

What therefore I claim as my improvement in knobs, as mentioned, is as follows—that is to say, I claim:

The mode, substantially as described, of forming the glass head with the silvering-chamber d, and connecting such head to the shank B, having the passage b leading through it, and the cap A, provided with the tapering projection C, such consisting in inserting into the cap, so as to fill it and encompass the projection and extend across it, a mass of molten glass in sufficient quantity, and blowing air into it through the said projection b, so as to expand the mass, all being essentially as set forth.

JOHN DOUGHERTY.

Witnesses:
R. H. EDDY,
W. W. LUNT.